United States Patent
Takahashi

(10) Patent No.: US 6,378,247 B1
(45) Date of Patent: Apr. 30, 2002

(54) METHOD FOR AFFORESTATION OF SANDS AND THE LIKE

(75) Inventor: Satoru Takahashi, Tokyo (JP)

(73) Assignee: Tokyo University of Agriculture, Tokyo (JP)

( * ) Notice: Subject to any disclaimer, the term of this patent is extended or adjusted under 35 U.S.C. 154(b) by 0 days.

(21) Appl. No.: 09/487,602

(22) Filed: Jan. 19, 2000

(51) Int. Cl.$^7$ ............................................... A01G 25/00
(52) U.S. Cl. ............................ 47/75; 47/74; 47/40.5; 47/1.01 R
(58) Field of Search .......................... 47/71, 25, 1.01 F, 47/73–75, 84, 40.5

(56) References Cited

U.S. PATENT DOCUMENTS

| | | | | |
|---|---|---|---|---|
| 4,369,599 A | * | 1/1983 | Franclet et al. ................. | 47/74 |
| 5,044,120 A | * | 9/1991 | Couch ............................. | 47/79 |
| 5,461,825 A | * | 10/1995 | Daimon et al. ................. | 47/71 |

FOREIGN PATENT DOCUMENTS

| | | |
|---|---|---|
| JP | 60-49722 | 3/1985 |
| JP | 1-60613 | 12/1989 |
| JP | 4-104741 | 4/1992 |
| JP | 6-197626 | 7/1994 |
| JP | 4103132684 | * 12/1998 |
| JP | 2000-32840 | 2/2000 |

* cited by examiner

Primary Examiner—Peter M. Poon
Assistant Examiner—Floris Copier
(74) Attorney, Agent, or Firm—McDermott, Will & Emery

(57) ABSTRACT

A method for afforestation of sands and the like and a structure used for said method. The method and structure permit trees and vegetables to take root and grow easily and certainly in tropical arid land. The method comprises digging the ground to form a vertical hole with a prescribed sectional area and depth, fitting an outer cylindrical body into the hole, filling the outer cylindrical body with soil containing a water-holding material, making a hole with a prescribed sectional area and depth at the center of the soil in the outer cylindrical body, placing in the hole an inner cylindrical body with a prescribed sectional area and length which is filled with soil containing a water-holding material and has a large number of vent holes in its lower section, watering the soil in the outer cylindrical body and the inner cylindrical body so that the water-holding material absorbs sufficient water, sowing a seed or transplanting a nursery tree in the soil in the inner cylindrical body, and growing the plant, with the outer cylindrical body preventing water from escaping from the soil therein, and the soil in the outer cylindrical body isolating the soil in the inner cylindrical body from the ground heat, thereby keeping the soil for vegetation in a wet condition.

19 Claims, 5 Drawing Sheets

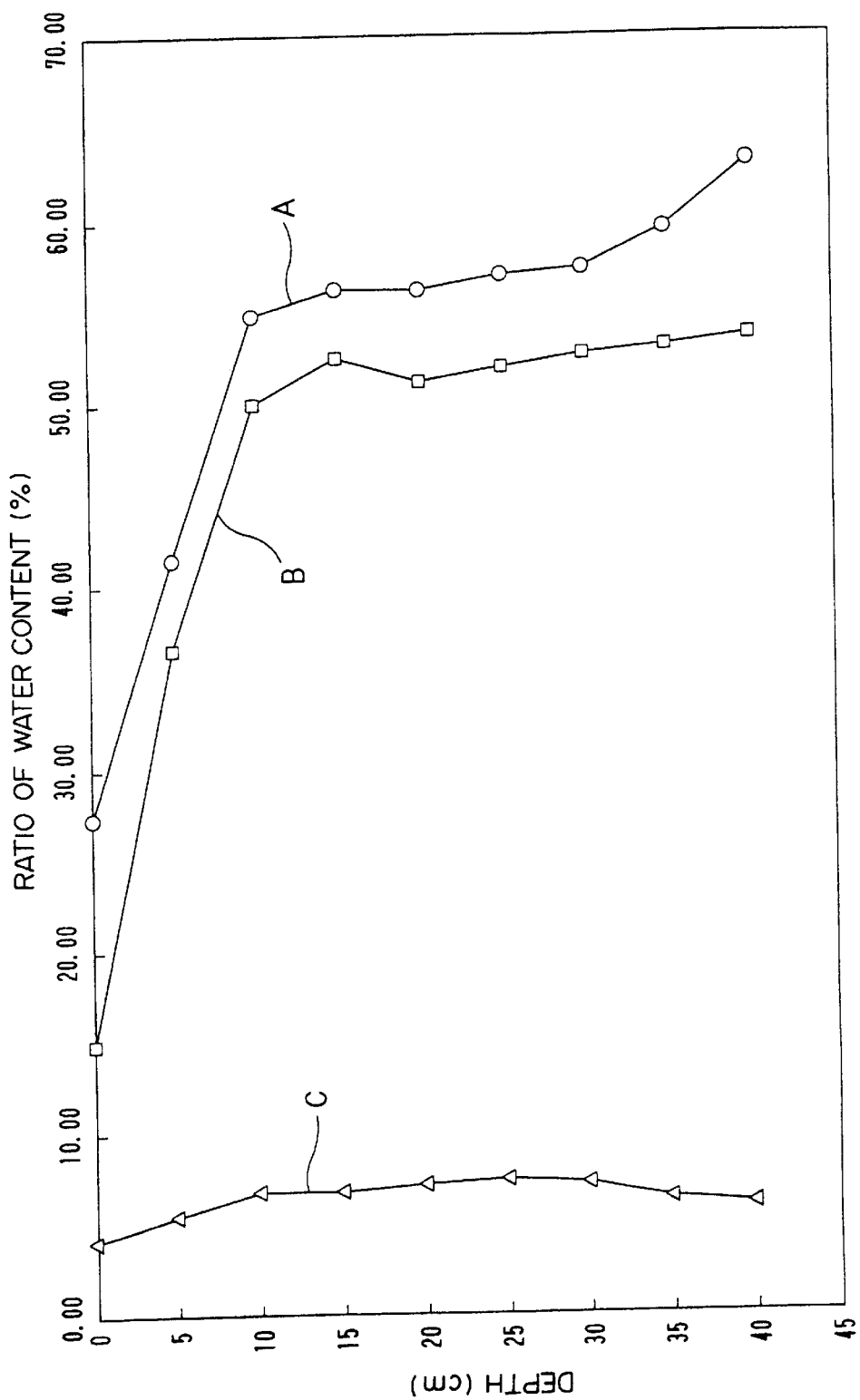

METHOD FOR AFFORESTATION OF SANDS AND THE LIKE

BACKGROUND OF THE INVENTION

1. Field of the Invention

The present invention relates to a method for afforestation and to a structure used for the method. This method is designed for afforestation of deserts, dunes, and sands suffering extreme droughtiness due to a larger amount of evaporation compared with rainfall.

With this method, one will be able to grow plants and vegetables in deserts, dunes, and sands, thereby making them fertile.

2. Description of the Related Art

There have been proposed various methods for afforestation of extremely droughty lands, such as deserts, dunes, and sands, where evaporation exceeds rainfall.

For example, Japanese Patent Laid-open No. 60613/1989 discloses a method for afforestation of deserts. This method consists of driving sheathing boards into the land for planting at its boarder, digging out soil in the surrounded area, forming an impervious layer on the bottom and wall of the hole, placing watering pipes and composting soil in the hole for forming a vegetation layer, seeding in the vegetation layer, covering the surface of the vegetation layer with a breathable protective film and a shading film, and allowing germination.

Also, Japanese Patent Laid-open No. 104741/1992 discloses a method for afforestation of arid land. This method consists of burying boards in soil of arid land, thereby forming a partitioned part surrounded by the buried boards, mixing the soil in the partitioned part with a water holding material in a certain ratio, planting trees in the partitioned part, tightly closing the top of the partitioned part after planting, and watering the partitioned part until the planted trees are rooted deep to ground water.

Japanese Patent Laid-open No. 197626/1994 discloses a method for afforestation of deserts. This method consists of forming partly in sand a substance or structure having both water retentivity and air permeability, and then seeding or planting in the upper part of the substance or structure.

In addition, Japanese Patent Laid-open No. 49722/1985 discloses a method for vegetation. This method consists of making holes at certain intervals in scree, desert, coastal sand dune, or slope, and setting in each hole a bottomless cylindrical body containing a nursery plant therein, said cylindrical body being reticulate, perforated, or of fibrous structure to impart water permeability and water absorptivity through capillary action and to permit lateral roots to grow through it.

OBJECT AND SUMMARY OF THE INVENTION

Of the above-mentioned four Japanese patents, the first and second are intended to create in land a water holding part suitable for plant growth, thereby growing plants in such a part. Therefore, afforestation in this manner takes a great deal of labor and expenses to form the vegetation layer. In addition, planted trees need innegligible labor and expenses for watering. Thus, the methods disclosed therein are not practicable in a vast desert.

By contrast, the third (which employs a water-retentive and air-permeable cylindrical structure) is advantageous over the first and second because it permits the vegetation layer to be formed easily and economically. However, the substance or structure does not retain water necessary for plant growth in desert where the daytime temperature is 70–80° C. or the average temperature is 40–50° C. even in the ground 30–50 cm deep. In such an environment, water evaporates easily due to ground heat, and hence there is an acute need for watering. The method of the third reference is effective in areas of comparatively moderate climate but is not effective in arid land (such as desert) where the daytime temperature is high and the water evaporation is rapid.

The method of vegetation disclosed in the fourth reference seems effective in that the planted trees can have root downward; however, like the method of the third reference, it will not work effectively in arid land such as desert.

The present invention was completed in view of the foregoing. It is an object of the present invention to provide a method for afforestation of sands and the like, said method permitting one to grow easily trees and vegetables in tropical arid land where the daytime temperature is high and the water evaporation is rapid. It is another object of the present invention to provide a structure to be used for said method.

The first aspect of the present invention resides in a method for afforestation of sands and the like, the method comprising digging the ground to form a vertical hole with a prescribed sectional area and depth, fitting an outer cylindrical body into the hole, filling the outer cylindrical body with soil containing a water-holding material, making a hole with a prescribed sectional area and depth at the center of the soil in the outer cylindrical body, placing in the hole an inner cylindrical body with a prescribed sectional area and length which is filled with soil containing a water-holding material and has a large number of vent holes in its lower section, watering the soil in the outer cylindrical body and the inner cylindrical body so that the water-holding material absorbs sufficient water, sowing a seed or transplanting a nursery tree in the soil in the inner cylindrical body, and growing the plant, with the outer cylindrical body preventing water from escaping from the soil therein, and the soil in the outer cylindrical body isolating the soil in the inner cylindrical body from the ground heat, thereby keeping the soil for vegetation in a cool and wet condition.

The second aspect of the present invention resides in a structure used for afforestation of sands and the like, the structure comprising a heat-insulating outer cylindrical body with a prescribed sectional area and length, and a heat-insulating inner cylindrical body with a prescribed sectional area and length, the inner cylindrical body being filled with soil for vegetation containing a water-holding material and being inserted into a hole formed at the center of the outer cylindrical body.

The third aspect of the present invention resides in a structure used for afforestation of sands and the like, the structure comprising a heat-insulating outer cylindrical body with a prescribed sectional area and length, which is filled with soil containing a water-holding material such that a hole with a prescribed sectional area and length is left at the center of the soil, and a heat-insulating inner cylindrical body with a prescribed sectional area and length, the inner cylindrical body being filled with soil for vegetation containing a water-holding material and being inserted into the hole formed at the center of the outer cylindrical body.

BRIEF DESCRIPTION OF THE DRAWINGS

FIG. 5 is a graph showing how the ratio of water content varies with the depth of soil. The ratio of water content is that in the inner cylinder placed in the outer cylinder, that in the inner cylinder buried alone in soil at the site, or that in soil at the site.

DESCRIPTION OF THE PREFERRED EMBODIMENT

According to the present invention, the method for afforestation of sands and the like is characterized by employing a cylindrical body consisting of an outer wall and an inner wall, both filled with soil containing a water-holding material. This cylindrical body is buried in the land to be afforested. Soil in the inner cylinder is for vegetation, and soil in the outer cylinder is for insulation of ground heat. Therefore, the soil for vegetation is kept moist, so that it helps germination of sown seeds or growth of planted nursery trees.

A detail description is given below of the method of the present invention for afforestation of sands.

Figure 1:
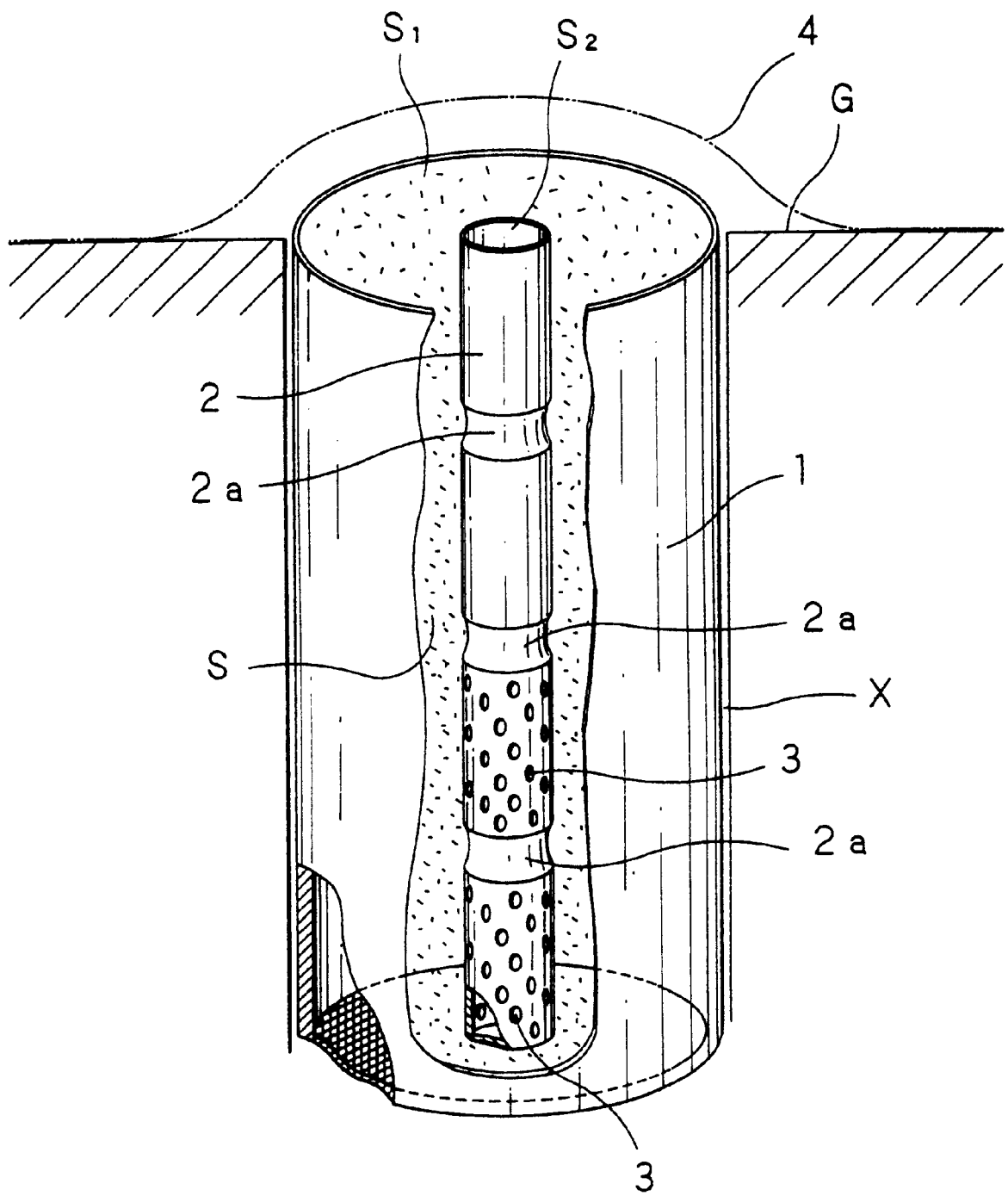
FIG. 1 is a partly cut-away perspective view illustrating the method for afforestation of sands and the like according to the present invention.
Figure 2:
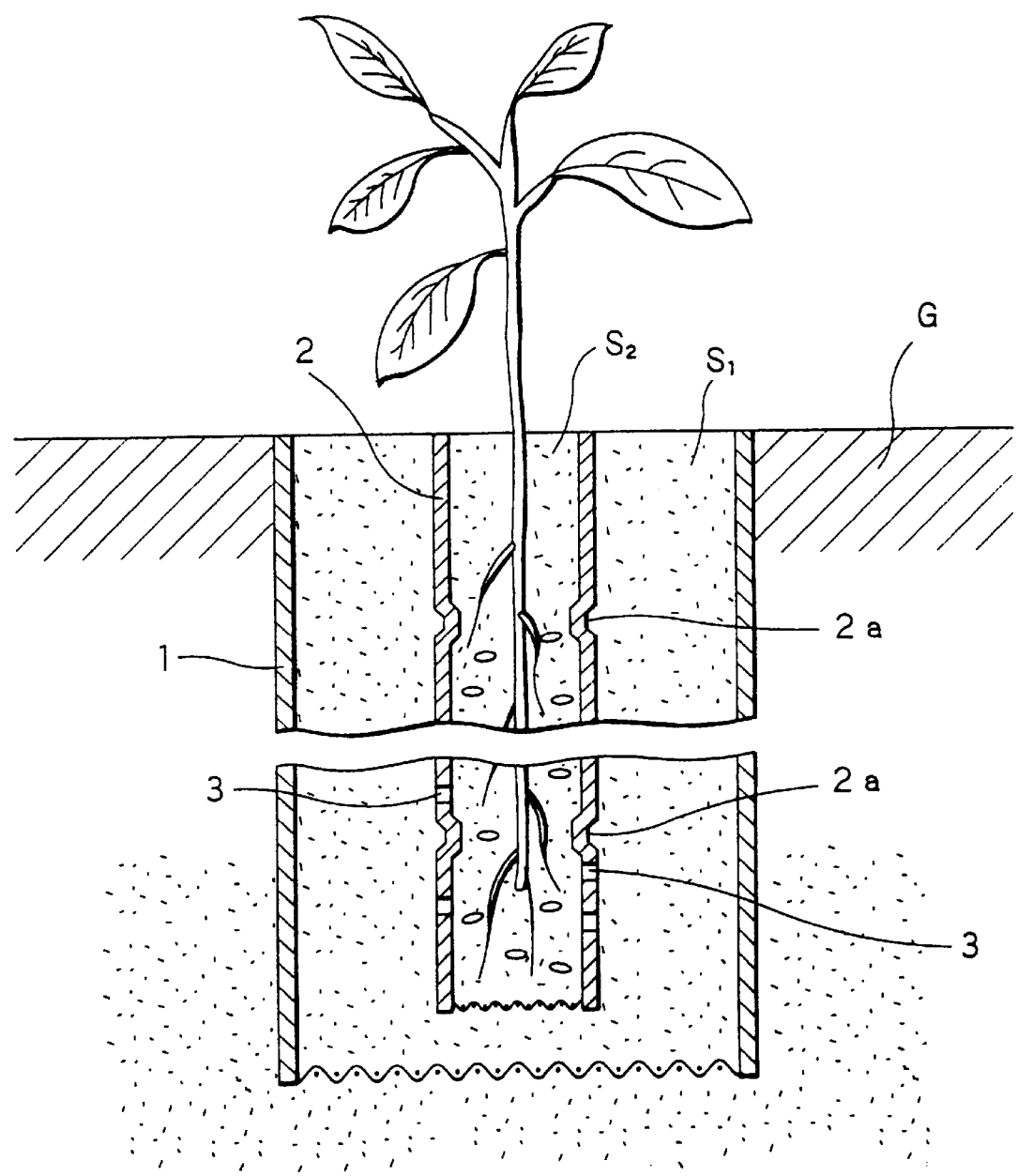
FIG. 2 is a sectional view showing the structure in which a plant grows.

FIGS. 1 and 2 illustrate the basic idea of the method for afforestation of sands and the like according to the present invention. Afforestation starts with digging the soil of the land like desert to make a cylindrical vertical hole (X) below the ground level (G). The hole has a prescribed sectional area (or diameter) and depth. Digging may be accomplished by using a powered earth auger. Into the hole (X) is fitted an outer cylinder (1) whose diameter is approximately equal to that of the hole (X) and whose length is approximately equal to the depth of the hole (X).

Then the cylinder is filled with soil (S1) containing a water-holding material. At the center of the soil is formed a space having a prescribed sectional area and depth. One way to form this space is to fill the hole with soil (S1), with a cylindrical body placed vertically at the center thereof, which is removed afterward. This cylindrical body has a prescribed diameter and length. Another way is by digging with a powered earth auger the soil (S1) which has been placed in the hole (X). The resulting hole should have a prescribed diameter and depth.

On the other hand, an inner cylinder (2) is filled with soil (S2) for vegetation containing a water-holding material. This inner cylinder has a diameter which is slightly smaller than that of the hole made in the soil in the outer cylinder (1) and also has a length which is almost the same as the depth of the hole made in the soil in the outer cylinder (1). It is closed at the bottom and open at the top. Filled with soil (S2), the inner cylinder (2) is loosely tied at certain intervals so that soil (S2) does not move downward. The tied parts are indicated by 2a.

The inner cylinder (2) has vent holes (3, 3, . . . ) at least in its lower surface, preferably in its entire surface, so that the soil therein is supplied with sufficient water. The filled and tied inner cylinder (2) is immersed in water so that the soil (S2) becomes sufficiently moist and the water-holding material absorbs sufficient water.

The inner cylinder (2) filled with soil (S2) containing a water-holding material is inserted into the hole made at the center of the outer cylinder (1). The gap between the inner cylinder (2) and the soil (S1) in the outer cylinder (1) is filled with soil. Then, the soil in the outer cylinder (1) is watered so that the soil (S1) becomes sufficiently moist and the water-holding material absorbs sufficient water.

In deserts, the soil temperature outside the outer cylinder (1) at a depth of about 30–50 cm is about 40–50° C., whereas the temperature of soil (S1) inside the outer cylinder (1) is kept at about 30° C. and temperature of soil (S2) inside the inner cylinder (2) is kept at about 25° C. Thus, the soil (S2) inside the inner cylinder (2) permits ordinary seeding or transplanting at a depth of about 50 mm below the surface.

The assembling of the outer cylinder (1), the inner cylinder (2), the soil (S1), and the soil (S2) may be carried out at the site of afforestation. However, it may also be possible to bring previously assembled sets into the site of afforestation.

One embodiment of the structure may be composed only of the outer cylinder (1) and the inner cylinder (2). This structure and the water-holding material are brought into the site of afforestation, and the soil (S1) and the soil (S2) are made by mixing local soil with the water-holding material.

An alternative embodiment of the structure is an assembly of the outer cylinder (1) filled with the soil (S1) containing a water-holding material, and the inner cylinder (2) filled with the soil (S2) containing a water holding material. This structure can be easily set once holes are dug in the ground at the site for afforestation. This contributes to afforestation in a simple way.

The outer and inner cylinders constituting the structure of the present invention may be formed from any material which is not specifically restricted so long as it retains their shape when they are filled with the soil containing a water-holding material. It is desirable that at least the outer cylinder should be made of a material which effectively prevents water from escaping out of the soil (S1) therein.

The outer cylinder may be formed from a sheet of plastics such as polyvinyl chloride, polyethylene, and polypropylene. It may also be molded from such plastics. The same holds true with the inner cylinder as a matter of course.

Moreover, the outer and inner cylinders may be formed from a material selected from biodegradable plastics, kraft paper, sisal hemp, cedar bark, carbon paper, and regenerated corrugated board, which decompose and vanish spontaneously in soil. This is desirable from the view point of environmental protection.

The outer and inner cylinders are not limited to those which have a circular cross section. They may have a polygonal or elliptic cross section, although a circular cross section is desirable.

The dimensions of the outer and inner cylinders may be determined according to the region, climate, weather, soil property, soil temperature, and soil moisture content. The ratio of the sectional area of the inner cylinder to the sectional area of the outer cylinder may preferably be from 1:15 to 1:20.

The length of the outer and inner cylinders may preferably be from 500 to 1500 cm, which is equivalent to the depth of the stratum water necessary for plant growth without artificial watering in deserts.

The outer cylinder has an open top but may or may not have a closed bottom. The open top may be covered with a sheet (4) after seeding or transplanting in order to prevent water evaporation. In the case of transplanting, a hole is made in the sheet for the nursery tree to pass through. The sheet permits water vapor to condense on the back side thereof due to temperature difference in the daytime and night. Condensed water drops are recycled for watering. The sheet may be replaced by small pebbles for the same effect.

By contrast, the inner cylinder should basically have a closed bottom. However, this is not mandatory, if the inner cylinder is constructed such that it does not permit the soil therein to slip down by gravity. The inner cylinder may have a large number of small vent holes at least in the lower part thereof. These vent holes permit the soil and water-holding material to be supplied with water for germination and also permits the roots to grow outward through the inner cylinder. These vent holes may also be formed entirely in the wall of the inner cylinder.

Figure 3:
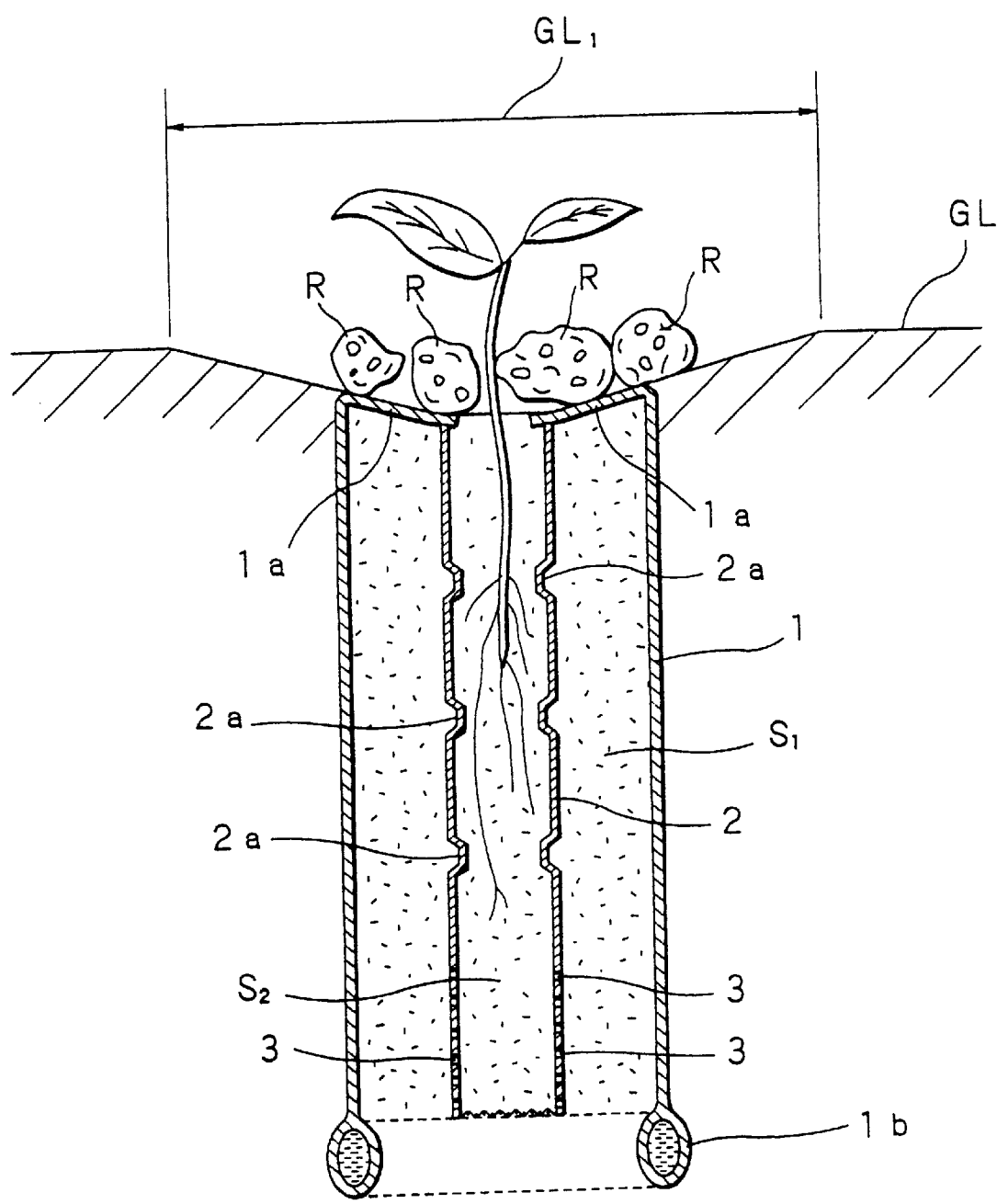
FIG. 3 is a sectional view illustrating another embodiment of the method for afforestation of sands and the like according to the present invention.

According to the present invention, the method for afforestation of sands and the like employs the structure as shown in FIGS. 1 and 2 as mentioned above. This structure may be modified as shown in FIG. 3 in order to improve the water retentivity of the soil in the outer and inner cylinders.

An example of such modification is to make the ground surface (GL) partly concave as indicated by GL1. The concave part forms a slope which gently declines toward the center, so that it collects rainwater and lets it flow into the soil (S1) and (S2) in the outer and inner cylinders.

Another example of the modification is to provide the outer cylinder with an upper rim (1a). This rim extends inward from the upper end of the outer cylinder such that it covers the soil (S1) in the outer cylinder. The second modification is similar to the first one in that the opening of the outer cylinder is covered; however, it has the advantage of not requiring the sheet (4) to cover the opening.

The object of the above-mentioned modification may be achieved by placing rocks (R) on the top of the outer and inner cylinders. These rocks produce the shade which prevents evaporation, keeping the soil moist for a long period time.

Another means for water retention is to form a water container at the lower end of the outer cylinder (1). When the outer cylinder (1) is buried, the water container (1b) filled with water functions as a weight which facilitates burying. In addition, a certain period of time after burying, the water container breaks in the soil to supply the soil with water.

According to the present invention, the soil in the outer and inner cylinders is incorporated with a water-holding material. This water-holding material may preferably be a substance which holds water and serves as a fertilizer. It is exemplified by charcoal, peat moss, compost, husk (of sorghum and peanut), seaweeds, dung (cow dung), weeds, and bentonite.

The soil into which the water-holding material is incorporated may be one which is available at the site for afforestation. The mixing ratio of the soil to the water-holding material varies depending on the degree of dryness at the site for afforestation. It is usually 1:1 for the soil in the inner cylinder and 1:0.3 to 1:0.5 for the soil in the outer cylinder.

The method for afforestation of sands and like according to the present invention may be applied to any of the following trees and vegetables.
(1) Trees
Forest trees: white popinac, parkinsonia, acacia albida, and acacia trotilis.
Tall trees: Indian ceder, big-leaved popinac, tamarind tree, Chinese date, Chinese tamarisk, coast oak, eucalyptus, "kotateishi", and Avicennia maria.
Shrubs: jojoba, "tougoma", and "shionoki".

Flowering trees: royal poinciana, "kidachibeninouzen", sambucus, caesar pinia, hibiscus, sweet-scented oleander, bougainvillea, jusmine, red sage, green pisonia, red pisonia, acalypha, Sansevieria trifasciata, and green acalypha.
Fruit trees: mango, guava, orange, mandarin, Ponkan mandarin, lemon, pomegranate, blue-crown passion flower, and "uchiwa" cactus.
(2) Vegetables
Leaf vegerables: "komatuna" (Brassica campestris), "pakuchoi", spinach, Jew's marrow, and cabbage.
Root vegetables: turnip, carrot, Japanese radish, and edible burdock.
Fruit vegetables: okra, tomato, sweet pepper, green pepper, cucumber, pumpkin, and melon.
Pulse crops: kidney bean, "edamame", soybean, and pea.

In tropical arid land, such as desert, the temperature on the ground surface usually reaches 70–80° C. and the temperature in the ground (30–50 cm deep) is also as high as 40–50° C. One reason why it is difficult to grow plants (such as trees and vegetables) in such arid land is that the environmental temperature (including the ground temperature) is close to the upper growth limiting temperature. At such a high ground temperature, transplanted plants do not take root easily, and they often die off or have their growth greatly inhibited.

Thus, the present invention provides a method for afforestation of sands and the like and a structure used for said method, which are designed to create an environment for seeds to germinate easily or for nursery trees to grow easily. This environment is not one which is created easily by irrigation. The environment created by irrigation supplies plants with water but plants spread their roots only in the surface layer of soil. By contrast, the environment produced by the method and structure according to the present invention permit plants to take root deep downward so that plants by themselves seek water in soil and get water permanently.

In order to collect data for afforestation of tropical arid land, the present inventors carried out the following fundamental experiments. Large containers each containing soil (600 mm thick) were placed in a facility for artificial weather conditions.
(A) In the first container was placed a double-walled cylindrical structure composed of an outer cylinder (150 mm in diameter and 400 mm long) and an inner cylinder (50 mm in diameter and 400 mm long), with both cylinders filled with soil.
(B) In the second container was placed a single-walled cylindrical structure, 50 mm in diameter and 400 mm long, filled with soil.
(C) In the third container was placed no cylindrical structure.

The above-mentioned three containers were allowed to stand in the facility, and the ground temperature (at a depth of 50 mm) was recorded at certain intervals for 24 hours (from 0:00 to 24:00, July 15). The results are shown in FIG. 4.

Moisture content was measured at different depths, and the ratio (%) of the measured value to the original moisture content was plotted against depth. The results are shown in FIG. 5.

Figure 4:
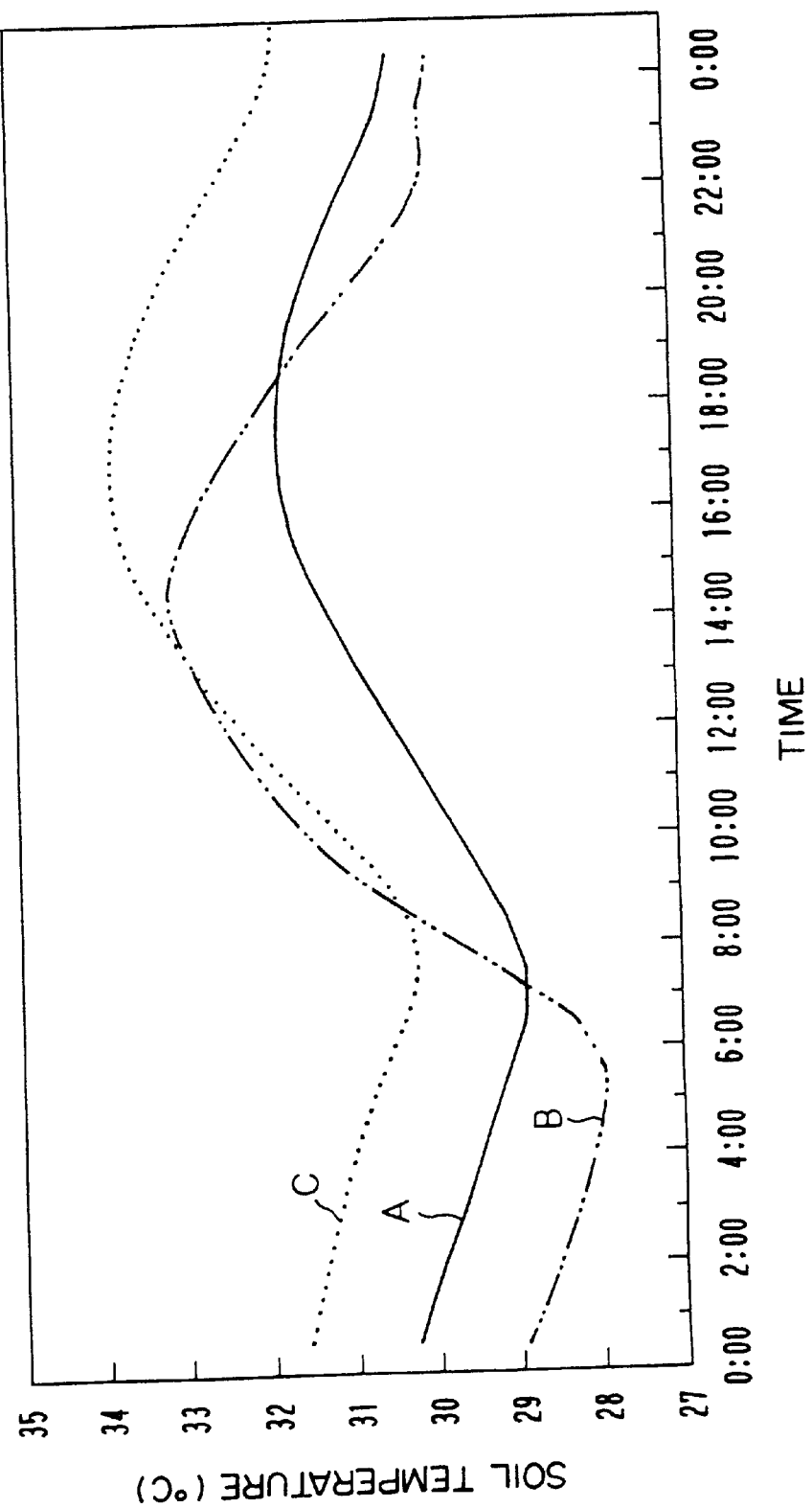
FIG. 4 is a graph showing how the soil temperature changes with time. The soil temperature is that in the inner cylinder placed in the outer cylinder, that in the inner cylinder buried alone in soil at the site, or that in soil at the site.

It is noted from FIG. 4 that the ground temperature varies less throughout 24 hours in the case where the double-walled cylinder was used than in the case where the single-walled cylinder was used or no cylinder was used. It is also noted from FIG. 5 that the ratio of moisture content at different depths is better in the case where the double-walled cylinder was used than in the case where the single-walled cylinder was used or no cylinder was used.

The foregoing suggests that the outer cylinder and the soil (containing a water-holding material) therein provide good heat insulation and water retentivity for the soil (containing a water-holding material) in the inner cylinder.

Incidentally, in FIGS. 4 and 5, A represents data in the case where the double-walled cylinder was used, B represents data in the case where the single-walled cylinder was used, and C represents data in the case where no cylinder was used.

The results of the experiments show that the method and structure for afforestation of sands and the like according to the present invention produce the following effect. The soil containing a water-holding material is kept moist because the outer cylinder isolates the soil therein from the external soil which has a ground temperature close to the growth limiting temperature. The outer cylinder also prevents evaporation of water from the soil therein. The soil in the outer cylinder functions as a heat insulator and effectively prevents the soil in the inner cylinder from getting hot and from losing moisture. Therefore, the soil in the inner cylinder is kept at about 25° C. adequate for plant growth in good moist conditions.

Under the above-mentioned conditions, plants take root easily and absorb nutrients from the soil in the cylinder. The inner cylinder causes roots to grow only downward, so that the roots absorb water and nutrients from the soil through the vent holes made in the lower part of the cylinder wall. Eventually, the roots seek water by themselves in the wet layer or water vein where rainwater is held deep in soil. Thus the transplanted nursery trees grow, and the object of afforestation is achieved in a short period of time.

The invention will be described in more detail with reference to the following examples and comparative examples.

EXAMPLE 1

Afforestation of desert was carried out in Djibouti (in north-eastern Africa) as follows. The desert in this country is composed of clay, silt, and sand, and it has a wet layer at a depth of about 1–2 meters.

The ground for afforestation was dug by using an earth auger to make a vertical hole, about 150 mm in diameter and about 1000 mm deep. An outer cylinder made of polyethylene sheet, 150 mm in diameter and 1000 mm long, with an open top and bottom, was inserted into the hole. This outer cylinder was filled with soil (at the site) mixed with peat moss as a water-holding material. The mixing ratio of soil to peat moss was 1:0.5 by volume.

At the center of the soil in the outer cylinder was made a vertical hole, about 50 mm in diameter and about 900 mm long, by using an earth auger.

A bag with an open top, about 50 mm in diameter and about 900 mm long, was made of polyethylene sheet. A large number of vent holes were made in the lower part (about 300 mm long) of the bag. This bag was filled with soil (at the site) mixed with peat moss as a water-holding material. The mixing ratio of soil to peat moss was 1:1 by volume. The filled bag was loosely tied at three positions. Thus, there was obtained the inner cylinder.

The inner cylinder was immersed in water for 24 hours so that the peat moss absorbed water. It was then inserted into the hole at the center of the outer cylinder. The gap between the inner cylinder and the soil in the outer cylinder was filled. The soil in the outer cylinder was watered so that the peat moss absorbed water sufficiently. The soil in the inner cylinder was sown with a seed of white popinac as a leguminous evergreen tree.

Comparative Example 1

The inner cylinder filled with soil and peat moss was prepared in the same way as in Example 1. It was immersed in water so that the peat moss absorbed water. The inner cylinder alone was buried in soil and sown with a seed of white popinac.

Comparative Example 2

Soil at the site was sown directly with a seed of white popinac, with the cylinders not used.

The height of the white popinac was measured 75 days after sowing to examine its growth in Example 1 and Comparative Examples 1 and 2. The results are shown in Table 1.

TABLE 1

| Examples | Height (cm) |
| --- | --- |
| Example 1 (double-walled cylinder) | 22 |
| Comparative Example 1 (single-walled cylinder) | 9 |
| Comparative Example 2 (without cylinder) | 5 |

Example 2 and Comparative Examples 3 and 4

The same procedure as in Example 1 and Comparative Examples 1 and 2 was repeated respectively except that the white popinac was replaced by acacia albida as a leguminous evergreen tree. The height of the acacia albida was measured 75 days after sowing to examine its growth. The results are shown in Table 2.

TABLE 2

| Examples | Height (cm) |
| --- | --- |
| Example 2 (double-walled cylinder) | 19 |
| Comparative Example 3 (single-walled cylinder) | 12 |
| Comparative Example 4 (without cylinder) | No germination |

It is noted from Tables 1 and 2 that the method for afforestation in Examples 1 and 2 is by far superior to that in Comparative Examples 1 to 4. It has been proved that the present invention provides an effective method for rapid afforestation of sands and the like.

According to the present invention, afforestation of sands and the like is accomplished in the following way. First, the soil is dug out to make a vertical hole. In the hole is placed an outer cylindrical body filled with soil containing a water-holding material. At the center of the outer cylinder is placed an inner cylindrical body filled with soil for vegetation containing a water-holding material. This inner cylinder has vent holes at least in its lower part. The outer cylinder isolates the soil therein from its surrounding soil, thereby preventing the evaporation of water from the soil therein. The soil in the outer cylinder functions as a heat insulator which isolates the soil therein from the surrounding soil whose temperature exceeds that for plant growth. Moreover, the soil in the outer cylinder keeps wet the soil in the inner cylinder, so that the seed or seedling is supplied with sufficient water for growth at an adequate temperature. After germination or rooting, the young plant takes root deep in search of wet layers or water veins where rainwater is retained. With sufficient water supply in this manner, the young plant grows rapidly. Thus it is possible to achieve afforestation of sands and the like easily and rapidly.

According to the present invention, the method of afforestation of sands and the like employs a double-walled cylindrical structure. The inner cylinder filled with soil for vegetation mixed with a water-holding material is surrounded by the outer cylinder filled with soil containing a water-holding material and having a certain thickness. The inner cylinder is placed in the soil in the outer cylinder. The outer cylinder prevents the evaporation of water from the soil and water-holding material. The soil in the outer cylinder functions as a heat-insulating layer which protects the soil in the inner cylinder from an excessively high ground temperature inadequate for plant growth. In addition, the soil in the outer cylinder keeps cool the soil in the inner cylinder through water evaporation from it. Thus, the temperature and water content of the soil in the inner cylinder are kept adequate for plant growth at all times.

The method for afforestation according to the present invention is superior in that it permits afforestation with a small amount of material and labor without requiring special skills. It permits economical and efficient afforestation without large-scale construction work. Therefore, the present invention greatly contributes to afforestation of deserts and tropical arid land.

According to the present invention, the structure used for afforestation of sands and the like is composed of an outer cylinder having a heat-insulating effect and for holding therein soil containing a water-holding material and an inner cylinder placed at a central portion of the outer cylinder, having a heat-insulating effect and for holding therein a soil for vegetation containing a water-holding material. Alternatively, the structure for afforestation is composed of an outer cylinder filled with soil containing a water-holding material and an inner cylinder filled with soil for vegetation containing a water-holding material, with the inner cylinder being placed within the outer cylinder. Either of these structure permits effective afforestation of deserts where water evaporates vigorously and the soil temperature is inadequate for plant growth.

What is claimed is:

1. A structure used for afforestation of sands and the like, said structure comprising a heat-insulating outer cylindrical body with a prescribed sectional area and length, and a heat-insulating inner cylindrical body with a prescribed sectional area and length, said inner cylindrical body being filled with soil for vegetation containing a water-holding material and being inserted into a hole formed at the center of the outer cylindrical body, wherein the outer cylindrical body is provided with a water container at its lower ends, said water container functioning as a weight and supplying water to the soil upon breakage.

2. A structure used for afforestation of sands and the like as defined in claim 1, wherein the inner cylindrical body is one which is formed from a plastic sheet or one which is molded from plastics or a pipe of polyvinyl chloride.

3. A structure used for afforestation of sands and the like as defined in claim 1, wherein the outer cylindrical body is one which is formed from a material selected from biodegradable plastics, kraft paper, sisal hemp, cedar bark, carbon paper, and regenerated corrugated board, which decompose and vanish spontaneously in soil.

4. The structure of claim 1, wherein said water-holding material is at least one selected from the group consisting of charcoal, peat moss, compost, husk, seaweeds, dung, weeds, and bentonite.

5. The structure of claim 1, wherein said water container is configured to break over time.

6. The structure of claim 1, wherein said water container is biodegradable.

7. The structure of claim 1, wherein said inner cylindrical body includes a closed bottom end.

8. The structure of claim 1, wherein said outer cylindrical body is configured to be placed into the ground such that soil surrounds said outer cylindrical body.

9. A structure used for afforestation of sands and the like, said structure comprising a heat-insulating outer cylindrical body with a prescribed sectional area and length, which is filled with soil containing a water-holding material such that a hole with a prescribed sectional area and length is formed at the center of the soil, and a heat-insulating inner cylindrical body with a prescribed sectional area and length, said inner cylindrical body being filled with soil for vegetation containing a water-holding material and being inserted into the hole formed at the center of the outer cylindrical body, wherein the outer cylindrical body is provided with a water container at its lower ends, said water container functioning as a weight and supplying water to the soil upon breakage.

10. A structure used for afforestation of sands and the like as defined in claim 9, wherein the inner cylindrical body is one which is formed from a plastic sheet or one which is molded from plastics.

11. The structure of claim 9, wherein said water-holding material is at least one selected from the group consisting of charcoal, peat moss, compost, husk, seaweeds, dung, weeds, and bentonite.

12. The structure of claim 9, wherein said inner cylindrical body includes a closed bottom end.

13. The structure of claim 9, wherein said outer cylindrical body is configured to be placed into the ground such that soil surrounds said outer cylindrical body.

14. A method for afforestation of sands and the like, said method comprising digging the ground to form a vertical hole with a prescribed sectional area and depth, fitting an outer cylindrical body into the hole, filling the outer cylindrical body with soil containing a water-holding material, making a hole with a prescribed sectional area and depth at the center of the soil in the outer cylindrical body, placing in the hole an inner cylindrical body with a prescribed sectional area and length which is filled with soil containing a water-holding material and has a large number of vent holes in its lower section, watering the soil in the outer cylindrical body and the inner cylindrical body so that the water-holding material absorbs sufficient water, sowing a seed or transplanting a nursery tree in the soil in the inner cylindrical body, and growing the plant, with the outer cylindrical body preventing water from escaping from the soil therein, and the soil in the outer cylindrical body isolating the soil in the inner cylindrical body from the ground heat, thereby keeping the soil for vegetation in a wet condition.

15. A method for afforestation of sands and the like as defined in claim 14, wherein the hole in the soil in the outer cylindrical body is formed by positioning a cylindrical body with a prescribed sectional area and length vertically at the center of the outer cylindrical body, and the space between the outer cylindrical body and the cylindrical body is filled with soil containing a water-holding material, and finally removing the cylindrical body.

16. A method for afforestation of sands and the like as defined in claim 14, wherein the hole in the soil in the outer cylindrical body is formed by filling the outer cylindrical body with soil containing a water-holding material and then digging the soil at its center to make a vertical hole with a prescribed sectional area and depth.

17. A method for afforestation of sands and the like as defined in claim 14, wherein the surface of the ground within a certain area gently declines toward the inner cylindrical body.

18. A method for afforestation of sands and the like as defined in claim 14, wherein the water-holding material is any one or more selected from char coal, peat moss, compost, husk of sorghum and peanut, seaweeds, dung such as cow dung, weeds, and bentonite.

19. A method for afforestation of sands and the like as defined in claim 14, wherein the inner cylindrical body is one which is prepared by filling a cylindrical body with a prescribed sectional area and length with soil containing a water-holding material, loosely tying at certain intervals along the length, and immersing in water so that the water-holding material absorbs sufficient water through vent holes made at least in the lower section of the cylindrical body.

* * * * *